US005319539A

United States Patent [19]

Shinskey

[11] Patent Number: 5,319,539
[45] Date of Patent: Jun. 7, 1994

[54] METHOD AND APPARATUS FOR GENERATING AN OPTIMAL GAIN OF PROCESS CONTROL EQUIPMENT

[75] Inventor: Francis G. Shinskey, Foxboro, Mass.

[73] Assignee: The Foxboro Company, Foxboro, Mass.

[21] Appl. No.: 889,474

[22] Filed: May 27, 1992

[51] Int. Cl.$^5$ .................. G05B 13/02; G05B 13/00
[52] U.S. Cl. ......................... 364/157; 364/162
[58] Field of Search ............... 364/152, 153, 154, 157, 364/162

[56] References Cited

U.S. PATENT DOCUMENTS

| Re. 33,267 | 7/1990 | Kraus | 364/158 |
|---|---|---|---|
| 3,515,860 | 6/1970 | Fitzgerald et al. | 364/155 |
| 3,617,717 | 11/1971 | Smith | 364/156 |
| 3,671,725 | 6/1972 | Bakke | 364/159 |
| 3,786,242 | 1/1974 | Brooks | 364/159 |
| 3,867,712 | 2/1975 | Harthill et al. | 340/6 R |
| 3,876,872 | 4/1975 | Spitz | 364/154 |
| 3,961,234 | 6/1976 | Chambers et al. | 318/561 |
| 3,992,616 | 11/1976 | Acker | 235/156 |
| 3,995,478 | 12/1976 | Wilhelm, Jr. | 364/153 |
| 4,186,384 | 1/1980 | Acker | 340/347 |
| 4,346,433 | 8/1982 | Rutledge | 364/162 |
| 4,441,151 | 4/1984 | Hayashibe | 364/157 |
| 4,602,326 | 7/1986 | Kraus | 364/158 |
| 4,855,897 | 8/1989 | Shinskey | 364/148 |
| 4,903,192 | 2/1990 | Saito et al. | 364/157 |
| 4,959,767 | 9/1990 | Buchner et al. | 364/157 |
| 5,091,844 | 2/1992 | Waltz | 364/153 |
| 5,124,626 | 6/1992 | Thoen | 318/610 |
| 5,191,521 | 3/1993 | Brosilow | 364/160 |

FOREIGN PATENT DOCUMENTS

| 0405924 | 6/1989 | European Pat. Off. |
| 932461 | 5/1982 | U.S.S.R. |
| 1012202 | 4/1983 | U.S.S.R. |

OTHER PUBLICATIONS

Shinskey, Process Control Systems, McGraw-Hill, 1988, pp. 150-157 (month unknown).
Ulery et al., "Software requirements for Statistical Quality Control," Instrument Society of America, 1986, pp. 821-828 (month unknown).
Badavas et al., "Principles of Statistical Quality Control . . ." The Foxboro Co., May 9, 1988, pp. 1-56.
Badavas et al., "Statistical Process Control Embedded in Open Industrial Systems," ISA, Oct. 16-21, 1988, pp. 1299-1310.
Epperly et al., "Statistical Process Control Integrated with Distributed Control Systems," Nat'l Petroleum Retainers Assoc., Oct. 30-Nov. 2 1988, pp. 1-15.
MacGregor et al., "On Line Statistical Process Control," Chemical Engineering Progress, Oct. 1988, pp. 21-31.
Shinskey, "How Good are our Controllers in Absolute Performance and Robustness?" Measurement+Control, vol. 23, May 1990, pp. 114-121.
Shinskey, "Putting Controllers to the Test," Chemical Engineering, 1990, pp. 96-106 (month unknown).
Shinskey, "Absolute Performance and Robustness Measures . . ." Proceedings: 46 Annual Symposium on Instrumentation . . . 1991, pp. 55-63 (month unknown).
Shinskey, "Model Predictors: The First Smart Controllers," I&CS 1991, pp. 49-52 (month unknown).
Shinskey, "Evaluating Feedback Controllers Challenges Users and Vendors," Control Engineering, 1991, pp. 75-78 (month unknown).
Shinskey, "Controlling Temperature in Batch Reactors," INTECH, 1992, pp. 69-72 (month unknown).

Primary Examiner—Jerry Smith
Assistant Examiner—Paul Gordon
Attorney, Agent, or Firm—Lahive & Cockfield

[57] ABSTRACT

An improved system for tuning process control equipment applies a load change of amplitude δq to the process to effect a change in it and, therefore, in the controlled variable. Monitoring the response of the controller to that change, the system identifies an observed overshoot, $OVS_o$, in the manipulated variable signal. From that overshoot signal and a predetermined theoretical overshoot signal, $OVS_T$, the system generates an optimum gain, $K_{opt}$, as a function of the mathematical expression $K_{opt} = K*(1+OVS_T)/(1+OVS_o)$, where K is the current gain of the automatic control subsection, $OVS_o$ is the observed overshoot, and $OVS_T$ is the predetermined overshoot.

18 Claims, 3 Drawing Sheets

METHOD AND APPARATUS FOR GENERATING AN OPTIMAL GAIN OF PROCESS CONTROL EQUIPMENT

REFERENCE TO RELATED APPLICATIONS

This application is related to the following copending, commonly assigned applications, assigned to the assignee hereof and filed the same day herewith.

U.S. patent application No. 07/889,472, for METHOD AND APPARATUS FOR ANALYZING PROCESS CHARACTERISTICS filed on May 27, 1992; and U.S. patent application No. 07/889,473, for IMPROVED METHOD AND APPARATUS FOR ADAPTIVE DEADTIME PROCESS CONTROL filed on May 27, 1992.

The teachings of the above-cited applications are incorporated herein by reference.

BACKGROUND OF THE INVENTION

The invention relates to process control and, more particularly, to improved methods and apparatus for determining optimum gain settings for process control equipment.

"Process control" refers to the control of the operational parameters of a process by monitoring one or more of its characteristics over time. It is used to ensure that the quality and efficiency of a process do not vary substantially during a single run or over the course of several runs. Process control has application in both the manufacturing and service sectors.

A process control unit, or "controller," typically operates by monitoring and comparing a process characteristic, the controlled variable, with a desired "setpoint" level to determine whether the process is operating within acceptable bounds. As the controlled variable begins to deviate from the setpoint, the controller manipulates one of the process inputs, the manipulated variable, to bring the process back to the desired level of activity.

For example, as shown in FIG. 1, a process controller can oversee a process in which fluid flows at a constant rate from a continuously refilled tank. The controller monitors the liquid level in the tank and, when necessary to prevent the tank from running dry or overflowing, adjusts an inlet valve to increase or restrict the inflow.

Among the controllers developed by the art is the so-called proportional-integral-derivative (PID) controller shown in FIG. 2a. This generates the manipulated variable signal, m, as a predetermined mathematical function of the controlled variable signal, c. The output of such a controller can be expressed by the mathematical relation:

$$m = \frac{100}{P}\left(e + \frac{1}{I}\int e\,dt - D\frac{dc}{dt}\right)$$

where,
m is the manipulated variable;
e is the error (the difference between the controlled variable and the setpoint);
P, I and D are, respectively, the proportional band, integral time constant and derivative time constant of the controller.

The art has also developed controllers which operate by modeling the specific processes they control. This is in contrast to the PID controller, which generates the manipulated variable signal as a generalized function of the controlled variable signal. One such model-based controller is the dead time controller, which uses the process dead time and lag (as well as the controlled variable) to generate the manipulated variable.

Dead time is the time it takes a change in the manipulated variable applied to a process to be reflected by a change in the controlled variable generated by that process. Lag is the time, after the dead time period, that it takes the controlled variable to move approximately 63% of its final value, following a step change in the manipulated variable.

A dead time controller of the type referred to above is shown in FIG. 2b. It is constructed by adding a "dead time" element, i.e., a time delay, into the integral feedback loop of a PID controller. This controller is referred to by the mnemonic "$PID\tau_d$."

To function properly, a process controller must be tuned to the process it controls. According to a prior art open-loop tuning method, controller settings are made in accord with values of parameters such as the process gain, $K_p$, which reflects the magnitude by which the process responds to a step change in the manipulated variable. In accord with a conventional open-loop method, the operator applies a single step to the process, monitor its response and, from that, makes calculations necessary to determine the process parameters.

According to the prior art closed-loop tuning method, the controller is used to drive the process/controller loop into oscillation, and from that, process parameters are inferred. Under this method, the controller is typically placed in proportional mode and the band setting, P, is decreased until the loop begins to cycle. In that state, the process parameters are determined, for example, from the natural period of oscillation and the controller proportional band setting.

While the aforementioned methods are acceptable for tuning conventional PID controllers, they have not proven successful for model-based controllers and, particularly, controllers with dead time, such as $PID\tau_d$ controllers.

It is, accordingly, an object of this invention to provide improved systems for process control. More particularly, an object is to provide improved methods and apparatus for tuning process control equipment.

A further object is to provide improved methods and apparatus for tuning model-based controllers and, more particularly, dead-time controllers.

SUMMARY OF THE INVENTION

These and other objects are attained by the invention which provides, in one aspect, a process control system that attains optimum gain based on values of observed and theoretical "overshoots" of the manipulated variable signal.

The system provides an improvement on process control equipment of the type having an automatic control subsection which generates a manipulated variable signal from, inter alia, a controlled variable signal and a gain, K, and which subsection automatically applies that manipulated variable signal to the process for control thereof.

The improvement is characterized by an element that applies a load change of amplitude δq to the process to effect a change in it and, therefore, in the controlled variable. A further element monitors the response of the automatic control subsection to the resulting change in the manipulated variable signal and, particularly, identifies a peak amplitude, $\delta m_o$, therein following cessation of the load change.

The system generates an observed overshoot signal, $OVS_o$, as a function of a ratio of the peak amplitude, $\delta m_o$, to said load amplitude $\delta q$. And, from that overshoot signal and a predetermined theoretical overshoot signal, $OVS_\tau$, generates an optimum gain, $K_{opt}$.

Particularly, in accord with one aspect of the invention, the system can generate the optimum gain in accord with the mathematical expression $$K_{opt} = K*(1+OVS_\tau)/(1+OVS_o)$$

where,
K is the current gain of the automatic control subsection,
$OVS_o$ is the observed overshoot, and
$OVS_\tau$ is the predetermined overshoot.

The current controller gain K can be reset in accord with the optimum gain, $K_{opt}$, as determined above.

According to further aspects of the invention, the predetermined overshoot, $OVS_\tau$, is determined in accord with the type of process being controlled. For a first-order non-self-regulating process, the system generates $OVS_\tau$ to be substantially equal to $4/\pi$.

For a first-order self-regulating process, on the other hand, the system generates $OVS_\tau$ as a function of the mathematical expression $$OVS_\tau = e^{-\tau_d/\tau_1}$$

where
$\tau_1$ is a primary time constant of that process; and
$\tau_d$ is a dead time of that process.

For a second-order non-self-regulating process that has dead time, $\tau_d$, and a second time constant, $\tau_2$, that are substantially equal, a system according to the invention generates $OVS_\tau$ to be substantially equal to 1.325. For such a process, the system can alternatively generate $OVS_\tau$ as a function of the mathematical expression $$OVS_\tau = (4/\pi)*(1+0.04\tau_2/\tau_d)$$

where
$\tau_2$ is a secondary time constant of the process and
$\tau_d$ is a dead time of the process.

For a second-order self-regulating process, the system can alternatively generate $OVS_\tau$ as a function of the mathematical expression $$OVS_\tau = e^{-\tau_d/(\tau_1+\tau_2)}$$

where
$\tau_1$ is a primary time constant of the process
$\tau_2$ is a secondary time constant of the process, and
$\tau_d$ is a dead time of the process.

Still other aspects of the invention include methods for process control in accord with the operation of the systems described above.

These and other aspects of the invention are evident in the drawings and in the detailed description which follows.

BRIEF DESCRIPTION OF THE DRAWINGS

A better understanding of the invention may be attained by reference to the drawings, in which.

DETAILED DESCRIPTION OF THE ILLUSTRATED EMBODIMENT

Figure 3:
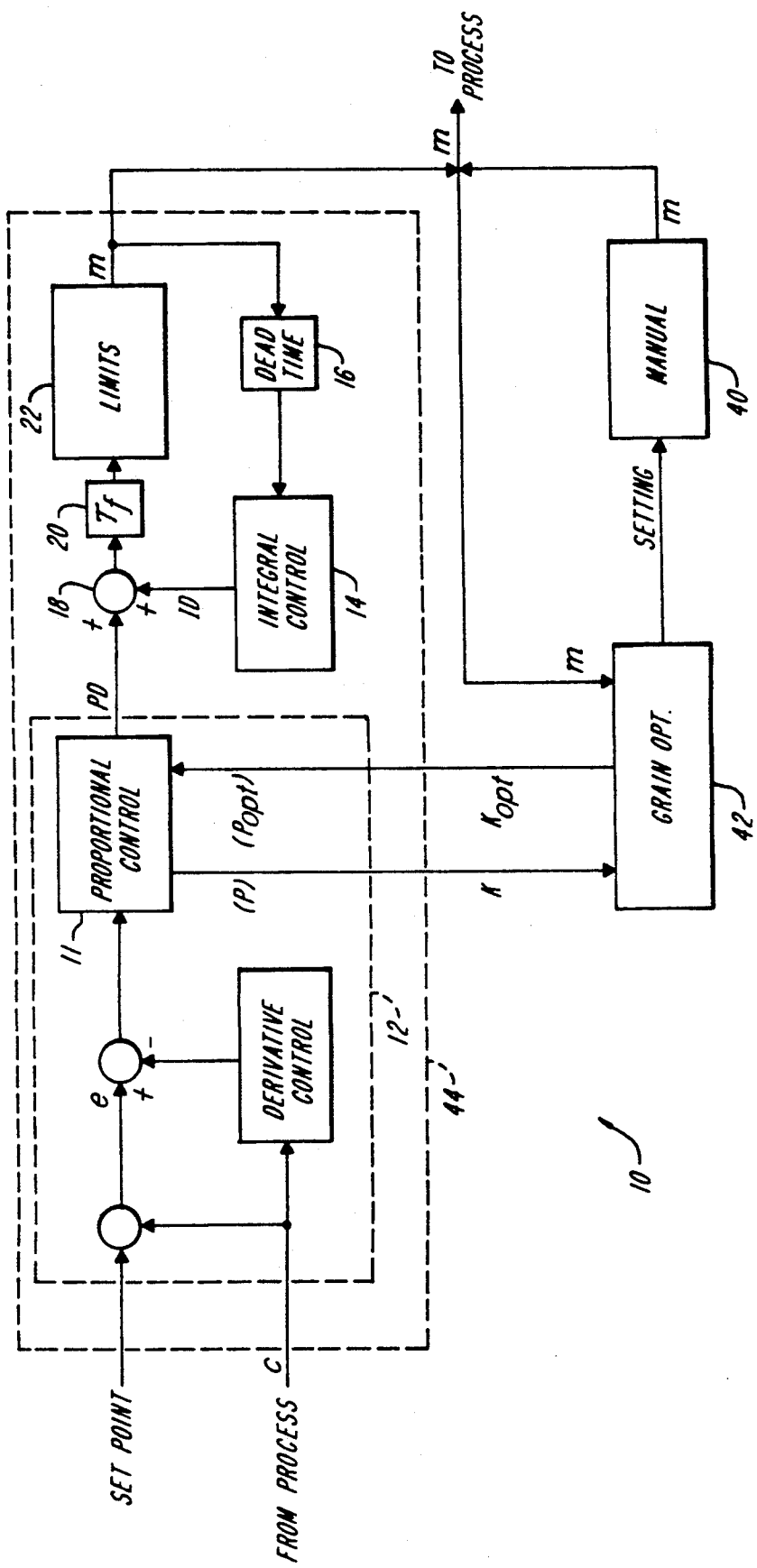
FIG. 3 depicts an improved process controller constructed in accord with the invention.

FIG. 3 depicts a preferred PID$\tau_d$ controller according to the invention. The controller 10 includes a proportional-derivative section 12 that accepts as input the controlled variable signal, c, and a desired setpoint. The controlled variable signal can be generated in a manner conventional to the art, for example, by measuring equipment coupled with the process itself. The setpoint, too, can be generated in a conventional manner, e.g., via the operator at a console (not shown).

The proportional-derivative section 12 operates in a manner like that of the corresponding section of a conventional PID$\tau_d$ controller. The section 12 generates a PD signal representative of an error in the controlled variable signal, c, particularly, as a function of a time rate of change of the controlled variable and a difference between it and the setpoint.

Illustrated integral control element 14 and dead time element 16, together, generate a signal, ID, representing a time-lagged and time-delayed form of the manipulated variable signal, m. These elements, too, operate in a manner like that of the corresponding elements of a conventional PID$\tau_d$ controller.

More particularly, the dead time section 16 time-delays the manipulated variable signal, m, by the controller dead time $\tau_d$. The integral control section, 14, lags that time-delayed signal with a time constant I.

A summation section 18 sums the PD signal generated by the PD section 12 with the ID signal generated by the integral control 14.

The output of element 18 is passed through filter 20, having a time constant $\tau_f$ which attenuates high frequency components of the summed signal.

The filtered signal can be passed through high and low limits 22 which limit the filtered signal to reduce integral windup.

The signal output by filter 20, as optionally limited by limiter unit 22, is applied to the process as manipulated variable signal m. That signal is fed back to the integral control and dead time elements 14, 16, as illustrated, for production of the signal ID.

As discussed in copending commonly assigned application U.S. patent application No. 07/889,473, for IMPROVED METHOD AND APPARATUS FOR ADAPTIVE DEADTIME PROCESS CONTROL, filed on May 27, 1992, the controller 10 automatically adjusts the filter time constant $\tau_f$ to maintain the level of noise, $\sigma_m$, in the manipulated variable signal at a predetermined level, $\sigma_{set}$.

Figure 4:
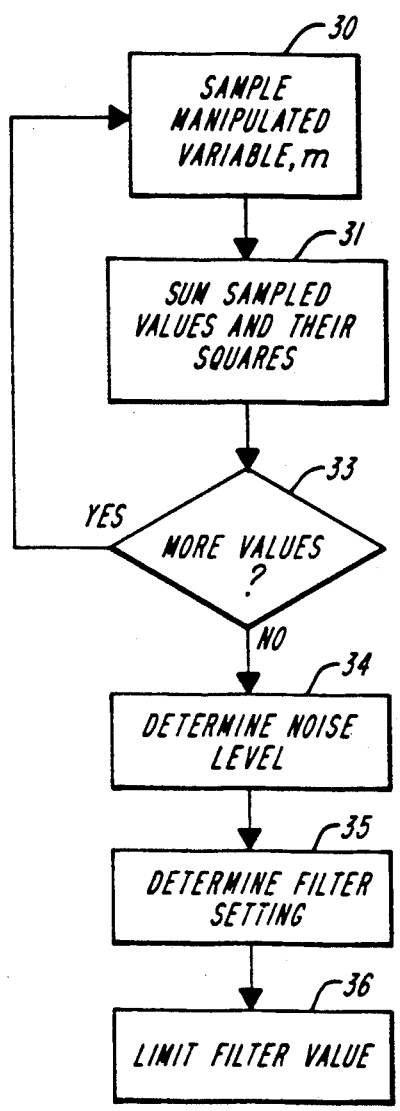
FIG. 4 depicts a preferred technique for automatic process control in the controller of FIG. 3.

A procedure for adjusting $\tau_f$ is shown in FIG. 4. There in step 30, the controller 10 samples values of the manipulated variable signal, m. In step 31, the controller sums values of m, as well as squares of those values. In step 33, the controller determines whether to sample more output values, preferably, so as to obtain a full set of samples over the period of a complete controller dead time $\tau_d$.

Following sampling and summing steps 30-33, the controller determines the noise level of the manipulated variable signal; see step 34. Preferably, this is determined in accord with the mathematical relation:

$$\sigma_m = \frac{\sqrt{n \cdot \Sigma(m^2) - (\Sigma m)^2}}{n \cdot (n-1)}$$

where, n is the number of sampled manipulated variable values;

$(\tau m)^2$ is the square of the sum of the sampled values; and $\Sigma(m^2)$ is the sum of squared sampled values.

In step 35, the controller determines the filter time constant in accord with the mathematical relation:

$$\tau_f = \tau_d/20 * \sigma_m/\sigma_{set}$$

where, $\sigma_{set}$ is predetermined noise level.

In step 36, the controller limits the value of the filter time constant, $\tau_f$, between the values 0 and $0.1 * \tau_d$.

Referring again to FIG. 3, a process controller 10 constructed in accord with the invention includes a manual control subsection 40 constructed and operated in a manner conventional in the art, as modified in accord with the teachings herein. The manual control subsection 40 responds to a control setting generated, e.g., by an operator, for applying a selected load signal to the process. That section 40 is adapted to respond to such a control setting signal generated by gain optimization element 42, as discussed below.

Together, above-described elements 12-22 comprise the automatic control subsection 44 of the process controller 10. Although a number of these elements contribute to the overall gain, K, of the subsection, a system constructed in accord with the invention sets the gain of a single one of them—proportional control element 11—in order to optimize the overall gain.

Accordingly, the gain of element 11, while traditionally denoted as 100/P, is herein denoted by the letter K. Likewise, an optimum gain setting for the proportional control element 11—and, therefore, that of automatic subsection 44—is denoted by the symbol $K_{opt}$.

To begin, the gain K is initialized, e.g., under operator or program control, in accord with conventional practice. Gain optimization element 42 thereafter optimizes that gain to generate the signal $K_{opt}$, which is then preferably used by the automatic subsection 44 in place of the then-current gain, K.

Gain optimization element 42 takes as input the manipulated variable signal, m, generated by limiter 22, as discussed above. The element 42 also accepts the signal K representative of the current gain of the automatic control subsection 44.

Those skilled in the art will appreciate that illustrated controller 20, including gain optimization element 42 as described herein, can be implemented based on the teachings herein in special purpose hardware. Preferably, those elements are implemented in software for execution, e.g., on a general purpose microprocessor. In this regard, it will be appreciated that such implementation can be attained using conventional programming techniques as particularly adapted in accord with the teachings herein to provide the disclosed structure, signaling and functionality.

Figure 5:
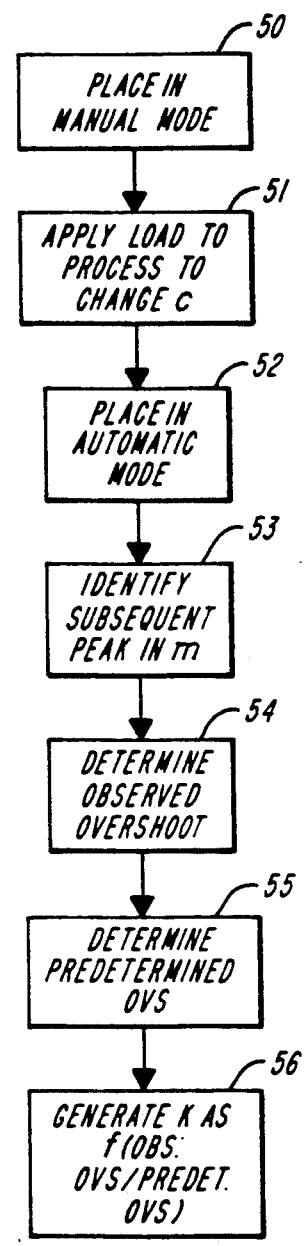
FIG. 5 depicts a preferred sequence of operations in accord with the invention for tuning the automatic process control subsection of the controller shown in FIG. 3.

The operation of a preferred gain optimization element 42 is illustrated in FIG. 5. In step 50, gain optimization element 42 places the controller 10 in manual mode. That is, it disables automatic control subsection 44 and enables manual control subsection 40.

In step 51, gain optimization element 42 generates a control setting signal to cause subsection 40 to apply a simulated load change of $\delta q$ to the process. The load change $\delta q$ is preferably applied as a step function of a magnitude sufficient to effect a conventional calibration-level response in the process.

In step 52, gain optimization element 42 places the controller 10 back in automatic mode.

As a result of application of the load change $\delta q$, the process being controlled responds, as reflected in an increase or decrease in the controlled variable. The automatic control subsection 44 section counters that change by altering the manipulated variable signal, m.

In step 53, the gain optimization element 42 monitors the above-described changes in the manipulated variable signal to identify a peak therein. The element 42 generates a signal $\delta m_o$ representing the difference between the steady-state value of the manipulated variable signal and the peak value.

In step 54, the gain optimization element 42 generates a signal $OVS_o$ representing an observed overshoot of the manipulated variable signal. This is determined as the numerical ratio of the peak amplitude, $\delta m_o$, to the load amplitude $\delta q$, i.e., the ratio $\delta m_o/\delta q$.

In step 55, the gain optimization element 42 generates a signal $OVS_\tau$ representing a predetermined overshoot. The value of that signal is determined in accord with the type of process being controlled. The process type can be designated by the operator or determined in accord with conventional techniques.

For a first-order non-self-regulating process, the gain optimization element 42 generates a value for the predetermined overshoot $OVS_\tau$ to be substantially equal to $4/\pi$ (approximately 1.2732).

For a first-order self-regulating process, on the other hand, element 42 preferably generates $OVS_\tau$ as a function of the mathematical expression $$OVS_\tau = e^{-\tau_d/\tau_1}$$

where $\tau_1$ is a primary time constant of the process; and $\tau_d$ is a dead time of that process.

For a second-order non-self-regulating process that has dead time, $\tau_d$, and a second time constant, $\tau_2$, that are substantially equal, the element 42 preferably generates $OVS_\tau$ to be substantially equal to 1.325. More preferably, for such a process it generates $OVS_\tau$ as a function of the mathematical expression $$OVS_\tau = (4/\pi) * (1 + 0.04 \, \tau_2/\tau_d)$$

where $\tau_2$ is a secondary time constant of the process, and $\tau_d$ is a dead time of the process.

For a second order self-regulating process, the system generates $OVS_T$ as a function of the mathematical expression $$OVS_T = e^{-\tau_d/(\tau_1+\tau_2)}$$

where
$\tau_1$ is a primary time constant of the process,
$\tau_2$ is a secondary time constant of the process, and
$\tau_d$ is a dead time of the process.

The process time constants referred to above can be provided to the gain optimization element 42 by the operator or determined in accord with conventional practice. Preferably, however, those time constants are determined in accord with the teachings of commonly assigned U.S. patent application No. 07/889,472, for METHOD AND APPARATUS FOR ANALYZING PROCESS CHARACTERISTICS filed on May 27, 1992.

In step 56, the gain optimization element 42 generates the optimum gain signal, $K_{opt}$. In a preferred practice, this is generated in accord with the mathematical expression $$K_{opt} = K*(1+OVS_T)/(1+OVS_o)$$

where,
K is the current gain of the automatic control subsection,
$OVS_o$ is the observed overshoot, and
$OVS_T$ is the predetermined overshoot.

As discussed above the optimum gain signal can be displayed to the operator, e.g., on a monitor (not shown). Preferably, it is applied by the gain optimization element 42 to the automatic control subsection 44 and, more particularly, proportional control element 11 to replace the current gain K.

Figure 1:
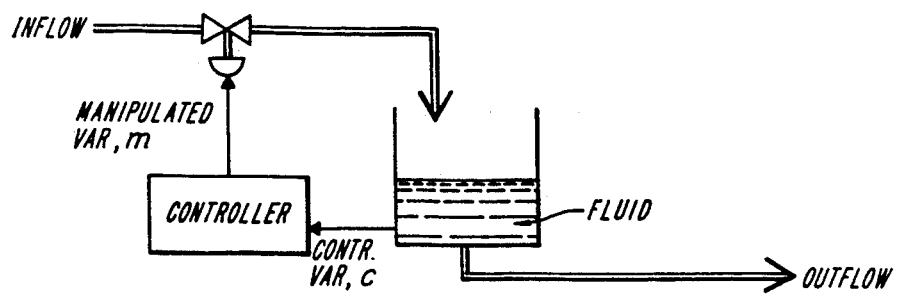
FIG. 1 depicts a fluid-flow process under control of a process controller.
Figure 2A:
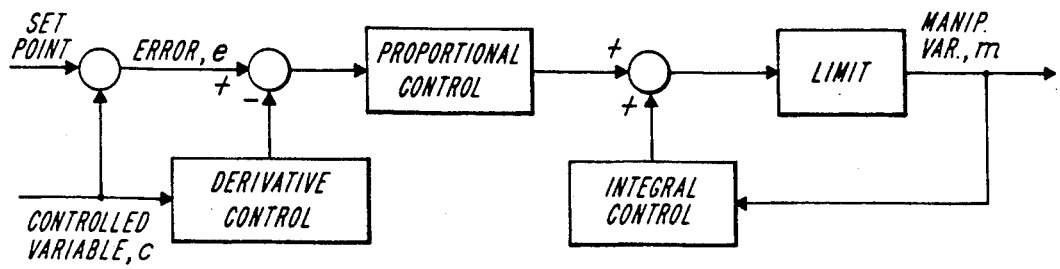
FIGS. 2a and 2b depict conventional PID and PID$\tau_d$ process controllers.
Figure 2B:
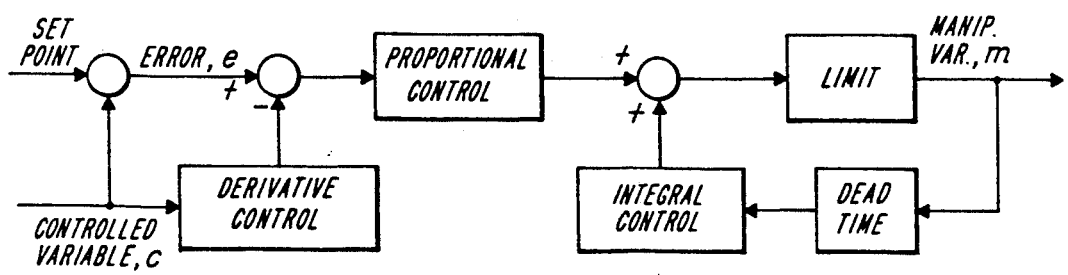

The foregoing describes improved methods and apparatus for tuning process controllers. Those skilled in the art will appreciate that the illustrated embodiments of the invention are exemplary and that other embodiments incorporating additions and modifications to that described above fall within the scope of the invention. Thus, it will be appreciated that the teachings herein can be applied to process controllers other than those shown in FIG. 3. These teachings can be applied, for example, to conventional PID and PID$\tau_d$ the type illustrated in FIGS. 2a and 2b.

These and other modifications are within the scope of the invention of which I claim:

1. In a method for optimizing a gain, K, of process control equipment that controls a process by generating a manipulated variable signal that varies a characteristic of that process, and by monitoring controlled variable signal representative of that characteristic,
said method including an automatic control step for generating said manipulated variable signal as a function of at least said controlled variable signal and said gain, K, and for applying that manipulated variable signal to said process,
the improvement comprising the steps of:
A. applying a load change of amplitude $\delta q$ to said process to effect a change in said characteristic,
B. identifying, following application of that load change, a peak amplitude, $\delta m_o$, of the manipulated variable signal generated during said automatic control step,
C. determining an overshoot value, $OVS_o$, as a function of a ratio of said peak amplitude, $\delta m_o$, to said load amplitude $\delta q$, and
D. determining an optimum gain, $K_{opt}$, as a function of said overshoot value, $OVS_o$, and a predetermined overshoot value, $OVS_T$.

2. In a method according to claim 1, the further improvement comprising the step of calculating the optimum controller gain, $K_{opt}$, from the existing gain, K, and the observed overshoot, $OVS_o$, and the predetermined overshoot value, $OVS_T$, as a function of the mathematical expression $$K_{opt} = K*(1+OVS_T)/(1+OVS_o).$$

3. In a method according to claim 2, the further improvement comprising the step of selecting said predetermined overshoot value, $OVS_T$, in accord with a classification of said process.

4. In a method according to claim 3, the further improvement comprising the step of selecting said predetermined overshoot value, $OVS_T$, for a first-order non-self-regulating process to be substantially equal to $4/\pi$.

5. In a method according to claim 3, the further improvement comprising the steps of
A. determining a primary time constant, $\tau_1$, and a dead time, $\tau_d$, of said process, and
B. selecting said predetermined overshoot value, $OVS_T$, for a first-order self-regulating process, as a function of the mathematical expression $$OVS_T = e^{-\tau_d/\tau_1}$$

where
$\tau_1$ is a primary time constant of that process; and
$\tau_d$ is a dead time of that process.

6. In a method according to claim 3, the further improvement comprising the step of selecting said predetermined overshoot value, $OVS_T$, for a second-order non-self-regulating process, having a second time constant, $\tau_2$, to be substantially equal to $$(4/\pi)*(1+0.04\tau_2/\tau_d).$$

7. In a method according to claim 6, the further improvement comprising the step of selecting said predetermined overshoot value, $OVS_T$, for a second-order self-regulating process as a function of the mathematical expression $$OVS_T = e^{-\tau_d/(\tau_1+\tau_2)}$$

where $\tau_2$ is a secondary time constant of that process.

8. In a method according to claim 2, the further improvement comprising adjusting the gain K of said process control equipment to be substantially equal to said optimum gain, $K_{opt}$.

9. In a method according to claim 2, the further improvement wherein said load-applying step comprises the steps of
A. placing said process control equipment in a manual mode of operation and stepping said manipulated variable signal a predetermined amount from an original value thereof, and
B. commencing execution of said automatic control step a predetermined time-interval after the stepping of said manipulated variable signal.

10. In process control equipment that generates a manipulated variable signal for controlling a characteristic of a process, and that monitors a controlled variable signal representative of that characteristic, said equipment including automatic control means for generating said manipulated variable signal as a function of at least said controlled variable signal and a gain, K, and for applying that manipulated variable signal to said process, the improvement for optimizing said gain comprising:

A. load-applying means for applying a load change of amplitude δq to said process to effect a change in said characteristic, B. peak amplitude means coupled with said automatic control means and with said load-applying means for identifying a peak amplitude of said manipulated variable signal, following application of said load change, generated by the automatic control means in response to the change effected in said characteristic, and generating a signal, $\delta m_o$, representative of that peak amplitude, C. observed overshoot means, coupled to said peak amplitude means, for generating an observed overshoot signal, $OVS_o$, as a function of a ratio of said peak amplitude, $\delta m_o$, to said load amplitude δq, and D. optimum gain means, coupled to said observed overshoot means, for generating an optimum gain signal, $K_{opt}$, as a function of said observed overshoot signal, $OVS_o$, and a predetermined overshoot signal, $OVS_\tau$.

11. In process control equipment according to claim 10, the further improvement wherein said optimum gain means comprises means for generating a signal representative of the optimum controller gain, $K_{opt}$, in accord with the mathematical expression $$K_{opt}=K*(1+OVS_\tau)/(1+OVS_o)$$

where

K is the current gain, $OVS_o$ is the observed overshoot, and $OVS_\tau$ is the predetermined overshoot.

12. In process control equipment according to claim 11, the further improvement wherein said optimum gain means comprises means for generating said predetermined overshoot signal, $OVS_\tau$, in accord with a type of said process.

13. In process control equipment according to claim 12, the further improvement wherein said optimum gain means comprises means for generating said predetermined overshoot signal, $OVS_\tau$, to be substantially equal to $4/\pi$ for a first-order non-self-regulating process.

14. In process control equipment according to claim 12, the further improvement comprising A. means for determining a primary time constant, $\tau_1$, and a dead time, $\tau_d$, of said process, and wherein said optimum gain means comprises B. means for generating said predetermined overshoot value, $OVS_\tau$, for a first-order self-regulating process, as a function of the mathematical expression $$OVS_\tau=e^{-\tau_d/\tau_1}$$

where $\tau_1$ is a primary time constant of that process; and $\tau_d$ is a dead time of that process.

15. In a process according to claim 12, the further improvement wherein said optimum gain means comprises means for generating said predetermined overshoot value, $OVS_\tau$, for a second-order non-self-regulating process having a second time constant, $\tau_2$, that is substantially equal to a dead time, $\tau_d$ of that process, as a function of the mathematical expression $$OVS_\tau=(4/\pi)*(1+0.04\ \tau_2/\tau_d)$$

where $\tau_2$ is a secondary time constant of that process.

16. In process control equipment according to claim 12, the further improvement wherein said optimum gain means comprises means for generating said predetermined overshoot value, $OVS_\tau$, for a second-order self-regulating process having a second time constant, $\tau_2$, that is substantially equal to $$e^{-\tau_d/(\tau_1+\tau_2)}.$$

17. In process control equipment according to claim 11, the further improvement wherein said automatic control means includes means responsive to said optimum gain signal, $K_{opt}$, for adjusting the gain K used thereby.

18. In process control equipment according to claim 10, the further improvement wherein said load-applying means includes A. means for placing said process control equipment in a manual mode of operation and for stepping said manipulated variable signal a predetermined amount from an original value thereof, and B. means invoking said automatic control means a predetermined time-interval after the stepping of said manipulated variable signal.

* * * * *